INVENTOR.
PETER K. SCHOENING
BY Ford E. Smith
ATTORNEY

3,772,419
METHOD FOR PRODUCING NON-METALLIC BEAM STRUCTURES
Peter K. Schoening, 5807 NE. 151st St., Bothell, Wash. 98011
Filed July 2, 1970, Ser. No. 51,998
Int. Cl. B29c 5/08
U.S. Cl. 264—112      4 Claims

ABSTRACT OF THE DISCLOSURE

The method of producing a rigid resin-bonded non-metallic beam structures involves molding a tensilely strong substrate of fiber-reinforced liquid polymeric material and molding thereon a compressively strong stratum composed of a mass of non-compressible particles arranged with compressive load-transmitting contact throughout including intermixing in said stratum liquid polymeric material and thereafter hardening the polymeric materials to integrally bond the fibers of said substrate and the particles of said stratum into a beam with a tensile-reinforced substrate and a compression-strengthened superposed stratum.

SUMMARY OF THE INVENTION

It is known to produce non-metallic grating by molding techniques in which continuous glass fibers are embedded in polymerized synthetic resinous compounds in the formation of bars or simple beam elements or multiple beam structures such as grating. In general, non-metallic grating dimensioned similar to metallic grating for the same uses has proved to have a flexural modulus of elasticity less than that of the similarly proportioned metallic structures. In other words, under equivalent loads on like spans, non-metallic gratings have deflected more than equivalent dimensioned metallic grating. This can be overcome, of course, by increasing the proportions of the non-metallic grating or by adding supporting elements to the substructure to reduce the spans to which the non-metallic grating is subjected tending to nullify the use of non-metallic gratings. The problem is one of increasing the flexural modulus of the non-metallic grating or other beam structures without increasing the bulk or the dimensions of the elements forming the grating. The principal object of this invention has been the provision of a non-metallic beam structure which is light in weight, and relatively small in dimension yet has a high modulus of flexure. This is accomplished by molding a stratified beam comprising a substrate having high tensile strength and a superposed integral stratum having high compressive strength. Tensile and compressive strengths with respect to a given polymeric resin may be varied by choice of type, physical placement, and use of selected reinforcement. The molded substrate comprises long substantially continuous fiberglass strands oriented lengthwise of the beam structure, and either prestressed or not prestressed. The overlying stratum comprises a mass of non-compressible particles in intimate particle-to-particle load transmitting contact throughout. The strands of the substrate and the particles of the surface stratum are embedded in a liquid polymeric resin and interfacially bonded together in a rigid structure.

DESCRIPTION OF THE INVENTION

Figure 1:
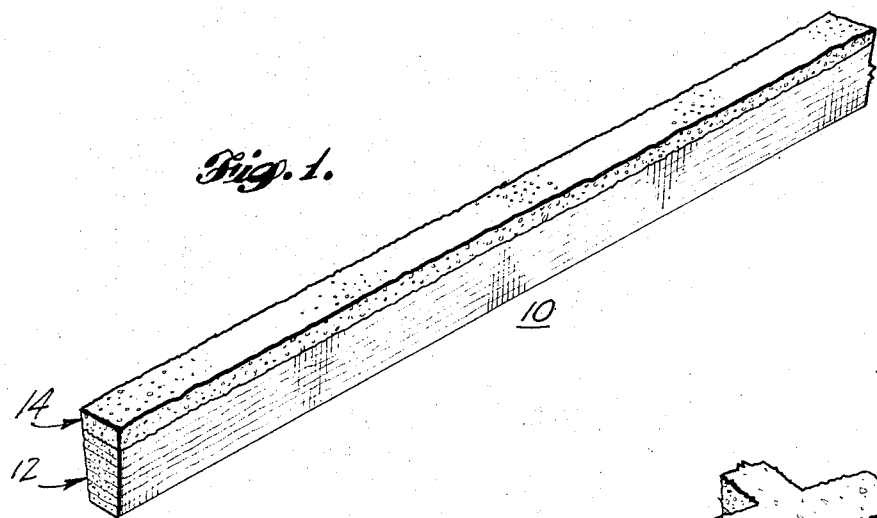
FIG. 1 is a perspective view of a beam according to this invention.

The elongated beam structure 10 of FIG. 1 is typical of the simplest application of the invention. It comprises substrate 12 and surface stratum 14, both of which strata extend throughout the beam length. Such a beam may be formed in a channel mold. For ease of removing the molded beam from the mold, the walls of the latter are flared slightly; hence the beam is shown as having side walls which diverge from the bottom of substrate 12 to a greater width at the surface stratum.

The composition of the substrate 12 is primarily a mass of elongated glass fibers oriented lengthwise of the substrate and solidly embedded in a polymerized synthetic resinous material. Preferably the glass fibers are obtained as long strips of roving for ease of handling, although other forms may be used. In the case of roving, a series of resin-wetted strips are packed into the channel mold in layered fashion, one after the other. Then the mold is partially filled with enough additional resinous material to insure complete impregnation of the roving, the filling of all interstices and to pool thereabove. Alternatively, the roving may be dry packed in the mold and the cavity flooded with resin to a depth greater than that of the roving.

Next, the substrate 12 is overlayed by a stratum 14 of particles tightly packed together in load-transmitting contact and of a depth, when bonded together or otherwise mixed to insure particles coating sufficient for the formation of bonds at the points of contact between the particles. Or the particles stratum 14 may be wetted with resin substantially its full depth to fill all interstices among the particles.

This assembly is cured or hardened so that the resin is polymerized and sets into a solid and resin portions of the substrate and of the particle stratum fuse and produce a fully integrated structure.

Synthetic polymers or resinous compositions useful in this invention may be selected from the group consisting of thermosetting and, under certain circumstances, thermoplastic resin which, when reinforced provide the physical and chemical properties desired in the final product. Such desirably are easy to handle, and relatively inexpensive. Preferred thermoset resins are polyesters, phenolics, ureas, vinylesters, and the like. Useful thermoplastic resins include vinyls, ABS, polypropylene, and the like.

Fire retardant properties are obtained by adding materials such as antimony trioxide, zinc borate, non-burning fillers, and other materials that reduce the composite flamability. Also resin and additive systems which provide ablative properties produce grates and beams which retain high strength even though subjected to short duration intense heat.

The most widely useful of the available fibers or strands in the practice of this invention is probably fiber-glass which has chemical inertness, great strength, is available in practically endless lengths, is easily wettable, easy to handle, and relatively inexpensive. Steel and stainless steel strands and wires, plastic strands, such as nylon and polypropylene, and natural fibers, e.g., sisal and cotton, may also be used.

Particles suitable for compounding the surface stratum 14 are selected to provide high compressive strength, corrosion resistance and anti-skid properties such as sand, frit, ground glass, and mixtures thereof. Sharp, white #12 sand has been used with marked success. Particle selection is essentially based on providing particles that are less crushable i.e. substantially non-compressible than the solidified resin components of the beam structure.

Figure 2:
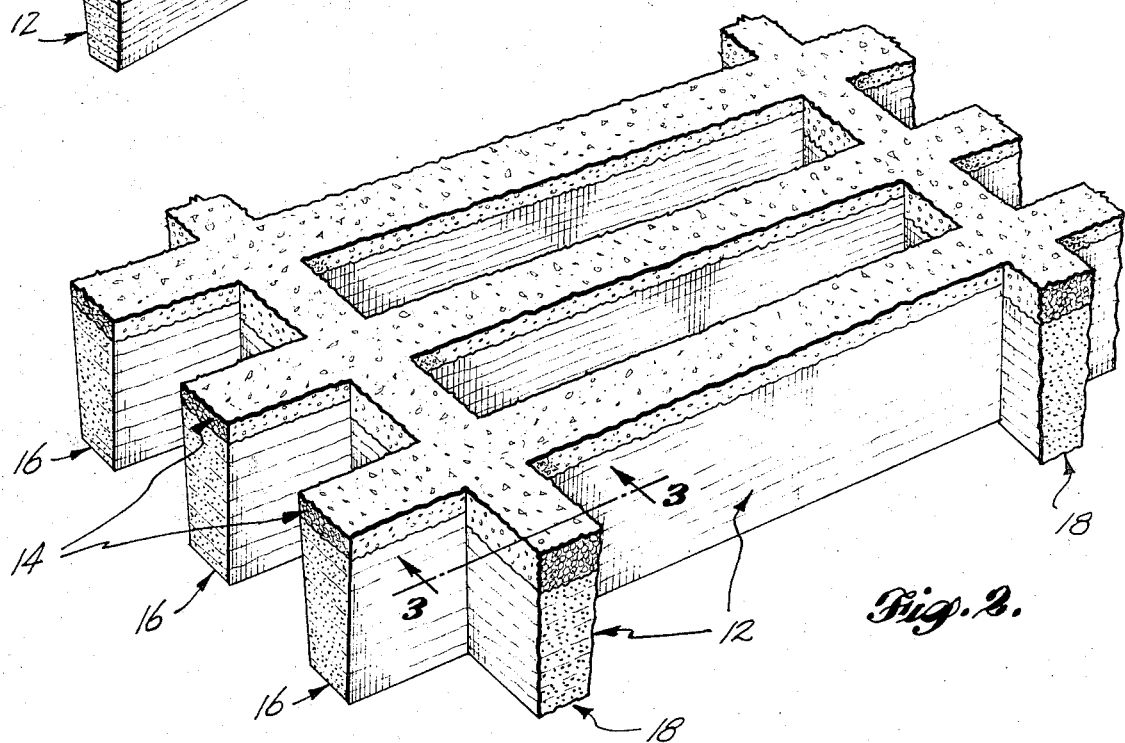
FIG. 2 is a fragmentary perspective view of a grate or grid embodying this invention.
Figure 3:
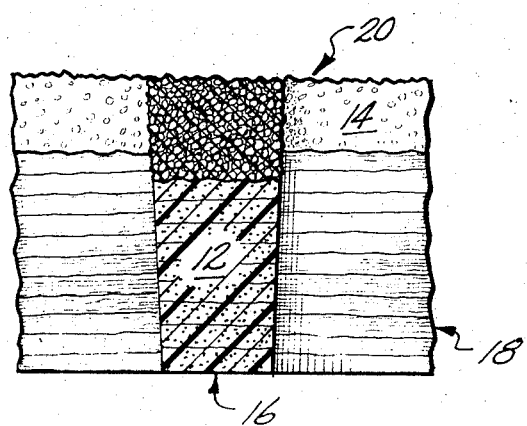
FIG. 3 is a cross section on line 3—3 of FIG. 2.

Referring to FIGS. 2 and 3, where is shown schematically the application of the invention in the production of a grate or grid, it will be seen that a plurality of beams have been produced in an openwork pattern. Span bars 16 are arranged in closely spaced parallel fashion. They are periodically crossed by tie bars 18 not so closely spaced. In a practical grid, span bars 16 are spaced about one inch on centers and tie bars 18 are spaced apart about four inches on centers. The height of the bars 16 and 18 may be varied to impart strength characteristics in the grid as required by all the spans to which they will be subjected. In general, all the bar heights may be between ½ of an inch and two inches. Desirably the span bars are usually thicker than the tie bars, since the latter function essentially to space and stiffen the grate and prevent buckling of the span bars.

Grid panels of this nature may be easily produced in two to four foot widths, and in lengths of 8, 9, and 10 feet. The preferred grid module is four feet by nine feet. The span bars extend in the width direction and the tie bars lengthwise of the grid.

In the production of grid panels, a female mold board of, say 4 x 9 feet, has its upper surface channeled or grooved in accordance with the desired pattern and geometrical arrangement to be produced. The mold board, being disposed horizontally, is customarily first flooded with resin to a depth of about one third of the channels. Into these flooded channels is laid strands of glass roving. It has been found desirable to alternatively lay in resin saturated glass roving strands first crosswise; then lengthwise; and again crosswise, and so forth until the desired depth in the channels is reached. As each layer of roving is completed, steps are taken to submerge it in the resin to insure complete wetting of the fibers and to dislodge or displace air bubbles that might at that point be entrapped. There are channel crossings in the mold at which there are approximately twice as many roving strands as are laid between the crossings. Since the roving strands displace resin, it will be seen that there is a higher resin content between the crossings than in the crossings. Usually the top-most layer of fiber strands lengthwise of the span bars 16 is arranged as the last of the strands laid down, thus insuring that there are more fiber strands lengthwise of the span bars 16, i.e. across the panel, than there are in the tie bars 18. This is desirable to impart substantial tensile strength to the span bars.

When the roving has all been laid into channels or grooves and properly wetted, resin is added to insure complete submersion of the glass fibers and to insure that there is an adequate amount of resin for the subsequent particle packing operation. At this point in the operation, the channels or grooves will not be completely filled by solid material such as the fiber strands, and will be capable of receiving at least between about one eighth inch and three sixteenths inch of sand or other particles. The particulate material is deposited on the upper surface of the mold board and is trowelled or spread into the channels approximately flush with the upper surfaces of the members between the channels. This is done in such a way as to insure that the resin pools overlying the fibers wet the surfaces of the particles and fill the interstices therebetween. The greater specific weight of the particles as compared with that of the resin will cause the particles to settle into the resin for firm and non-compressible binding together in particle-to-particle load-transmitting contact. Vibration applied to the table as a whole facilitates packing the particulate material in load-transmitting contact into the channel, insures its complete wetting, and the dislodgement of any entrapped air bubbles. It is desirable that a certain amount of the upper most of the particular elements, e.g., sand, project slightly above the resin to function in the complete grate as a non-skid upper surface 20.

It is apparent to those skilled in the art that in lieu of placing dry particulate material on the mold, the particles and resin may be mulled together into a paste-like or putty-like consistency and the same trowelled into the grooves. In the foregoing description, beam molding has been disclosed wherein the tensile and compressive factors have been assembled as they will reside in use, i.e., with the compressive stratum being formed over the tensilely strong substrate. However, the molding operation may practically be reversed in which case the particle stratum will be layed down first in the bottom of the mold channel and the tension stratum formed thereover. Of course, the finished product would be overturned in use.

It will be understood that every beam structure has a neutral axis that is disposed longitudinal of the beam and resides at some plane above the bottom surface of the beam and below the upper surface of the beam. In use and under loading, such a beam is in tension below the neutral axis progressively from approximately no tension at the neutral axis downward to its full tensile characteristics. Conversely above the neutral axis the beam is in compression progressively from zero compression at the neutral axis upward to the maximum of compression at the top surface when the beam is loaded. The design of a beam according to this invention thus must take into consideration the amount of loading to which the same can be expected to be subjected. Accordingly the designer of a particular beam will arrange that below his neutral axis there will be sufficient numbers of fibrous strands extending the length of the beam to insure that the beam is not overtensioned. And he will insure that the thickness of the bonded together load-transmitting particles in layer form above the neutral axis is sufficient to impart substantial compressive characteristics whereby the beam will be stiffened desirably and it will be insured that the beam under normal use circumstances will not be overstressed or strained. It has been found that with span bars 16 having an overall height of one inch, the fiber, resin portion should be approximately ¾ to ⅞ of an inch deep and the particle-resin portion should thereupon be approximately ¼ to ⅛ of an inch deep. Since the last of the strands laid down preferably run lengthwise of the span bar, it will be seen that the depth of the sand-resin portion of the cross bars in somewhat deeper, possibly as much as ¼ inch.

It has been determined that when a grate four feet wide, solely supported at its margins so that between those margins the grade is entirely in span and a weight of approximately 190 pounds is placed in the middle of the grate field spaced from an end edge, the deflection of a grate according to this invention is approximately ¼ of an inch. Compared to the deflection of a grate not including the particle-resin surface stratum which is observed to be approximately ½ to ⅝ of an inch at the least, this is a material advantage. This is believed to clearly demonstrate that a grate according to this invention has a stiffness materially superior to that of a grate manufactured solely of resin-strand material.

Although particular and preferred embodiments of non-metallic beam structures and the method producing them is shown and described, modifications and alterations following a study of this disclosure will naturally occur to those skilled in the art to which this invention pertains. All such as fall within the spirit and scope of the following claims, giving due to a liberal application of the doctrine of equivalents, are intended to be covered by this patent.

What is claimed is:

1. A method of molding a rigid resin-bonded stratified structural beam, comprising:
   (Step A) into a channel mold having the shape of said beam, packing layered strips of glass fiber roving wetted with a hardenable liquid polymeric resin, said fibers being oriented lengthwise within said channel;
   (Step B) partially filling said mold with more of said liquid polymeric resin to impregnate and submerge said roving and to form a depth of said liquid resin above said roving;

(Step C) depositing and tightly packing in said depth of liquid resin above said roving to fill said mold a layer of non-compressible particles selected from the group consisting of sand, frit, ground glass, and mixtures thereof, wherein said particles have particle-to-particle load-transmitting contact in said layer and the interstices of said layer are filled with said liquid resin; and (Step D) hardening said liquid polymeric resin to integrally bond said glass fiber roving and said layer of particles with the interface thereof being located to provide said beam with a tensile-reinforced substrate and a compression-strengthened superposed stratum.

2. The method of claim 1 in which the thickness of said substrate to said stratum is between about ¾ to ⅞ of inch in depth to between about ¼ to ⅛ of an inch in depth.

3. A method of molding a non-metallic grating comprising a plurality of crossed longitudinal and lateral, rigid resin-bonded stratified structural beams, comprising:

(Step A) into a channel-mold having longitudinal and lateral channels crossing each other to form said grating, each of said channel having the shape of said beams, packing layered strips of glass fiber roving wetted with a hardenable liquid polymeric resin, the fibers in said resin being oriented lengthwise within said channels; and said strips of said longitudinal channels crossing the strips of said lateral channels;

(Step B) partially filling said mold channels with more of said liquid polymeric resin to impregnate and submerge said roving and to form a depth of said liquid resin above said roving;

(Step C) depositing and tightly packing in said depth of liquid resin above said roving to fill each said mold channels a layer of non-compressible particles selected from the group consisting of sand, frit, ground glass, and mixtures thereof, wherein said particles have particle-to-particle load-transmitting contact in said layer and the interstices of said layer are filled with said liquid resin; and (Step D) hardening said liquid polymeric resin to integrally bond said glass fiber roving and said layers of particles with the interfaces thereof being located to provide each beam of said grating with a tensile-reinforced substrate and a compression-strengthened superposed stratum.

4. The method according to claim 3 in which each layer of glass fiber roving in each lateral channel is interposed transversely between pairs of longitudinally extending layers at the crossings of said channels throughout said grid grating.

References Cited

UNITED STATES PATENTS

| | | | |
|---|---|---|---|
| 1,953,457 | 4/1934 | Baer | 264—113 |
| 2,486,050 | 10/1949 | Miller et al. | 264—113 |
| 3,021,573 | 2/1962 | Benton | 264—71 |

FOREIGN PATENTS

| | | | |
|---|---|---|---|
| 541,543 | 5/1957 | Canada | 264—113 |

ROBERT F. WHITE, Primary Examiner

J. R. HALL, Assistant Examiner